United States Patent
Lee et al.

(10) Patent No.: US 9,659,512 B2
(45) Date of Patent: May 23, 2017

(54) ROLLABLE DISPLAY DEVICE

(71) Applicant: SAMSUNG DISPLAY CO., LTD., Yongin, Gyeonggi-Do (KR)

(72) Inventors: Jusuck Lee, Seoul (KR); Junghun Lee, Hwaseong-si (KR); Youn Joon Kim, Seoul (KR); Sangjo Lee, Hwaseong-si (KR); Kyungmin Choi, Seoul (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 125 days.

(21) Appl. No.: 14/803,644

(22) Filed: Jul. 20, 2015

(65) Prior Publication Data

US 2016/0163242 A1 Jun. 9, 2016

(30) Foreign Application Priority Data

Dec. 3, 2014 (KR) ........................ 10-2014-0172139

(51) Int. Cl.
```
G09F 9/00       (2006.01)
G09F 15/00      (2006.01)
G09F 9/30       (2006.01)
G09F 11/29      (2006.01)
G09B 29/06      (2006.01)
```

(52) U.S. Cl.
CPC .......... *G09F 15/0062* (2013.01); *G09F 9/301* (2013.01); *G09B 29/06* (2013.01); *G09F 11/29* (2013.01)

(58) Field of Classification Search
CPC .......... G09F 11/29; G09F 11/18; G09F 17/00; G09F 11/30; G09F 11/32; G09F 9/301; G09B 29/06
See application file for complete search history.

(56) References Cited

U.S. PATENT DOCUMENTS

| | | | | |
|---|---|---|---|---|
| 4,646,453 A * | 3/1987 | Reinhart | .................. | G09D 3/10 40/117 |
| 7,234,503 B2 * | 6/2007 | Kwak | ........................ | E06B 9/42 160/295 |
| 7,428,792 B2 * | 9/2008 | Kochan | .................. | G09F 11/29 40/514 |

(Continued)

FOREIGN PATENT DOCUMENTS

| | | |
|---|---|---|
| JP | 09-216465 A | 8/1997 |
| JP | 2009-531688 A | 9/2009 |
| KR | 10-2013-0028453 A | 3/2013 |

*Primary Examiner* — Cassandra Davis
(74) *Attorney, Agent, or Firm* — Lee & Morse, P.C.

(57) ABSTRACT

A rollable display device includes a flexible display panel that displays an image, a first housing, inside which a first portion of the flexible display panel is storable, a second housing, inside which a second portion of the flexible display panel is storable, a first rotation member inside the first housing, the first portion of the flexible display panel being windable and unwindable on the first rotation member, a second rotation member inside the second housing, the second portion of the flexible display panel being windable and unwindable on the second rotation member, a first rail at one end of the first rotation member, the first rail being defined in the first rotation member to have a spiral shape having two ends, and a first guide part penetrating through the first housing and being inserted in the first rail.

17 Claims, 8 Drawing Sheets

(56) References Cited

U.S. PATENT DOCUMENTS

| | | |
|---|---|---|
| 8,531,758 B2 | 9/2013 | Van Lieshout et al. |
| 9,120,290 B2 * | 9/2015 | Krall ........................ B32B 3/14 |
| 2007/0241025 A1 | 10/2007 | Parkes |
| 2008/0005942 A1 * | 1/2008 | Harney ................... G09F 11/21 40/518 |
| 2016/0083998 A1 * | 3/2016 | Grutzner ................... E06B 9/44 160/238 |
| 2016/0139633 A1 * | 5/2016 | Lee ....................... G06F 1/1652 345/33 |
| 2016/0353588 A1 * | 12/2016 | Kim .................... H05K 5/0017 |

* cited by examiner

ROLLABLE DISPLAY DEVICE

CROSS-REFERENCE TO RELATED APPLICATION

Korean Patent Application No. 10-2014-0172139, filed on Dec. 3, 2014, in the Korean Intellectual Property Office, and entitled: "Rollable Display Device," is incorporated by reference herein in its entirety.

BACKGROUND

1. Field

Embodiments relate to a rollable display device.

2. Description of the Related Art

As the market demand for flexible display devices continues to increase, various flexible display devices, such as a curved display device manufactured to have a specific curvature, a foldable display device curved with a specific radius curvature or bent with respect to a folding axis, a rollable display device rolled to a specific radius curvature, etc., have been developed.

SUMMARY

Embodiments are directed to a rollable display device including a flexible display panel that displays an image, a first housing, inside which a first portion of the flexible display panel is storable, a second housing, inside which a second portion of the flexible display panel is storable, a first rotation member inside the first housing, the first portion of the flexible display panel being windable and unwindable on the first rotation member, a second rotation member inside the second housing, the second portion of the flexible display panel being windable and unwindable on the second rotation member, a first rail at one end of the first rotation member, the first rail being defined in the first rotation member to have a spiral shape having two ends, and a first guide part penetrating through the first housing and being inserted in the first rail.

The rollable display device may further include first barrier parts that block both ends of the first rail. The first rotation member may be rotatable while the first guide part moves along the first rail. The first barrier parts may block the movement of the first guide part.

The first housing may include a first opening portion extending through the first housing along a second direction crossing a first direction. The first guide part may extend through the first opening portion and may be inserted in the first rail. The first and second housings may be spaced apart from each other in the first direction.

The first guide part may be moveable along the second direction in the first opening portion.

The first rail may be in a form of a spiral-shaped engraving recess defined in the first rotation member.

The first rail may be in a form of a spiral-shaped engraving recess located on an outer surface of the first rotation member.

The first portion of the flexible display may have an area that is substantially the same as an area of second portion of the flexible display. A boundary line at which the first portion contacts the second portion may correspond to a center line of the flexible display panel.

The rollable display device may further include a second rail at one end of the second rotation member, the second rail being defined in the second rotation member to have a spiral shape having two ends, and a second guide part penetrating through the second housing and being inserted in the second rail, wherein the second rotation member being rotatable while the second guide part moves along the second rail.

The rollable display device may further include second barrier parts that block both ends of the second rail, the second barrier parts blocking the movement of the second guide part.

The second rail may be in a form of a spiral-shaped engraving recess defined in the second rotation member.

The second rail may be in a form of a spiral-shaped engraving recess located on an outer surface of the second rotation member.

The second housing may include a second opening portion extending through the second housing along a second direction crossing a first direction. The second guide part may extend through the second opening portion and may be inserted in the second rail. The first and second housings may be spaced apart from each other in the first direction.

The rollable display device may further include a third rail at an other end of the first rotation member, the third rail being defined in the first rotation member to have a spiral shape having two ends, a fourth rail disposed at an other end of the second rotation member, the fourth rail being defined in the second rotation member to have a spiral shape having two ends, a third guide part penetrating through the first housing and being inserted in the third rail, and a fourth guide part penetrating through the second housing being inserted in the fourth rail.

The first housing may include a third opening portion extending along the second direction. The second housing may include a fourth opening portion extending along the second direction. The third guide part may pass through the third opening portion and is inserted in the third rail. The fourth guide part passes through the fourth opening portion and is inserted in the fourth rail.

The rollable display device may further include third barrier parts blocking both ends of the third rail, the third barrier parts blocking the movement of the third guide part, and fourth barrier parts blocking both ends of the fourth rail, the fourth barrier parts blocking the movement of the fourth guide part.

The third rail may be in a form of a spiral-shaped engraving recess defined in the first rotation member. The fourth rail may be in a form of a spiral-shaped engraving recess defined in the second rotation member.

The third rail may be in a form of a spiral-shaped engraving recess and may be located on an outer surface of the first rotation member. The fourth rail may be in a form of a spiral-shaped engraving recess and is located on an outer surface of the second rotation member.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
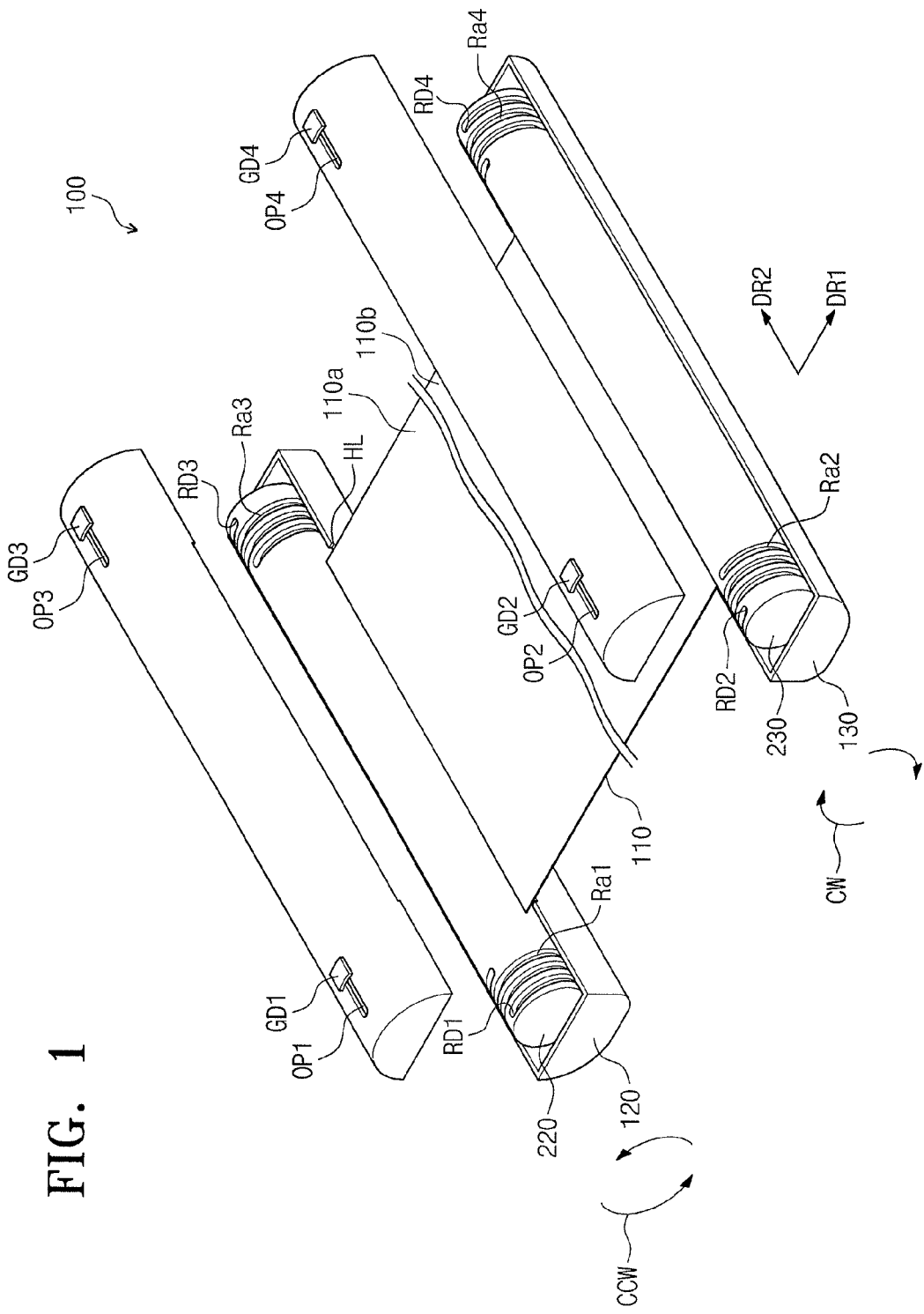
FIG. 1 illustrates an exploded perspective view showing a rollable display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the relevant art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 illustrates an exploded perspective view showing a rollable display device 100 according to an exemplary embodiment.

Referring to FIG. 1, the rollable display device 100 may include a flexible display panel 110, a first housing 120, a second housing 130, a first rotation member 220, and a second rotation member 230.

The flexible display panel 110 displays an image. The flexible display panel 110 may include a flexible substrate, and thus may have flexibility. The flexible display panel 110 may be rolled and kept inside the first housing 120 or the second housing 130. When an external force is applied to the flexible display panel 110, the flexible display panel 110 may be exposed to the outside of the first and second housings 120 and 130. For example, the flexible display panel 110 rolled and kept inside the first and second housings 120 and 130 may be exposed to the outside of the first and second housings 120 and 130 by being unrolled by the external force through an opening portion HL formed through each of the first and second housings 120 and 130.

A pixel serving as a minimum unit to display the image may be provided in a plural number in a display area of the flexible display panel 110. Each pixel may include at least one thin film transistor.

The first and second housings 120 and 130 may store the flexible display panel 110. Each of the first and second housings 120 and 130 may have a suitable shape to store the flexible display panel. For example, as shown in FIG. 1, the first and second housings 120 and 130 may have a substantially cylindrical shape.

The first and second housings 120 and 130 may be spaced apart from each other in a first direction DR1. The first housing 120 may store a first portion 110a of the flexible display panel 110 and the second housing 130 may store a second portion 110b of the flexible display panel 110.

The first rotation member 220 may be disposed inside the first housing 120, and the second rotation member 230 may be disposed inside the second housing 130. The first and second rotation members 220 and 230 may have a suitable shape to roll the flexible display panel 110. For example, each of the first and second rotation members 220 and 230 may have a substantially cylindrical shape elongated in a second direction DR2 crossing the first direction DR1

The first portion 110a of the flexible display panel 110 may be rolled around the first rotation member 220, and the second portion 110b of the flexible display panel 110 may be rolled around the second rotation member 230.

A first center axis penetrating through a center of the first rotation member 220 may be coupled to the first rotation member 220 and the first center axis may be connected to the first housing 120. A second center axis penetrating through a center of the second rotation member 230 may be coupled to the second rotation member 230 and the second center axis may be connected to the second housing 130. In some implementations, the first and second rotation members 220 and 230 may be rotated by a user who manually rotates the first and second center axes. In other implementations, the first and second rotation members 220 and 230 may be rotated by using devices having elasticity, e.g., a plate-shaped spring, a wire, etc.

The flexible display panel 110 may be connected to and rolled around each of the first and second rotation members 220 and 230. For example, one end of the flexible display panel 110 may be connected to and rolled around the first rotation member 220 and the other end of the flexible display panel 110 may be connected to and rolled around the second rotation member 230. In some implementations, each of the first and second rotation members 220 and 230 may include an engaging recess and the flexible display panel 110 may be engaged in the engaging recess.

A first rail Ra1 may be defined at one end of the first rotation member 220. The first rail Ra1 may be spaced apart from an area of the first rotation member 220 around which the flexible display panel 110 is rolled.

The first rail Ra1 may have a spiral shape spiraling around the first rotation member 220 along the second direction DR2. For example, the first rail Ra1 may be a spiral-shaped engraving recess HR (refer to FIG. 4A) defined in the first rotation member 220.

A first guide part GD1 may be inserted into the first rail Ra1 after penetrating through the first housing 120. For example, the first housing 120 may be provided with a first opening portion OP1 formed therethrough along the second direction DR2 crossing the first direction DR1, and the first guide part GD1 may be inserted into the first rail Ra1 after passing through the first opening portion OP1.

The first guide part GD1 may control or limit the rotation of the first rotation member 220. For example, when the first rotation member 220 rotates, the first guide part GD1 may more in the second direction DR2 along the first rail Ra1. When the movement of the first guide part GD1 is stopped by one of the first barrier parts RD1 disposed at each end of the first rail Ra1, the first rotation member 220 may be caught by the first guide part GD1, thereby controlling or limiting the rotation of the first rotation member 220.

A second rail Ra2 may be defined at one end of the second rotation member 230. The second rail Ra2 may be spaced apart from an area of the second rotation member 230, around which the flexible display panel 110 is rolled.

The second rail Ra2 may have a spiral shape spiraling around the second rotation member 230 along the second direction DR2. For example, the second rail Ra2 may be a spiral-shaped engraving recess HR (refer to FIG. 4A) defined in the second rotation member 230.

A second guide part GD2 may be inserted into the second rail Ra2 after penetrating through the second housing 130. For example, the second housing 130 may be provided with a second opening portion OP2 formed therethrough along the second direction DR2 crossing the first direction DR1 and the second guide part GD2 may be inserted into the second rail Ra2 after passing through the second opening portion OP2.

The second guide part GD2 may control or limit the rotation of the second rotation member 230. For example, when the second rotation member 230 rotates, the second guide part GD2 may move in the second direction DR2 along the second rail Ra2. When the movement of the second guide part GD2 is stopped by one of the second barrier parts RD2 disposed at both ends of the second rail Ra2, the second rotation member 230 may be caught by the second guide part GD2, thereby controlling or limiting the rotation of the second rotation member 230.

If a member such as the first and second guide parts GD1 and GD2, used to control the rotation of the first and second rotation members 220 and 230, were not present, the flexible display panel 110 might not be uniformly rolled into the first and second housings 120 and 130. For example, the flexible display panel 110 could be biased to one of the first and second housings 120 and 130 while being rolled into the first and second housings 120 and 130. In this case, when there is a limitation in size of the first and second housings 120 and 130, the flexible display panel 110 could become stuck in the first or second housing. However, according to the present exemplary embodiment, the rotation of the first and second rotation members 220 and 230 may be controlled by the first and second guide parts GD1 and GD2. For example, the first rotation member 220 may be rotated to allow the first portion 110a to be rolled into the first housing 120 and the second rotation member 230 may be rotated to allow the second portion 110b to be rolled into the second housing 130. The degree of the rotation of the first rotation member 220 may determined by selecting a length of the first rail Ra1, and the degree of the rotation of the second rotation member 230 is determined by selecting a length of the second rail Ra2. Accordingly, the flexible display panel 110 may be uniformly rolled into the first and second housings 120 and 130.

A third rail Ra3 may be defined at the other end of the first rotation member 220. The third rail Ra3 may be spaced apart from the area of the first rotation member 220, around which the flexible display panel 110 is rolled. For example, the first and third rails Ra1 and Ra3 may be positioned such that the area of the first rotational member 220 around which the flexible display panel 110 is rolled is disposed between the first and third rails Ra1 and Ra3.

The third rail Ra3 may have a spiral shape spiraling around the first rotation member 220 and along the second direction DR2. The third rail Ra3 may be a spiral-shaped engraving recess HR (refer to FIG. 4A) defined in the first rotation member 220.

A third guide part GD3 may be inserted into the third rail Ra3 after penetrating through the first housing 120. For example, the first housing 120 may be provided with a third opening portion OP3 formed therethrough along the second direction DR2. The third guide part GD3 may be inserted into the third rail Ra3 after passing through the third opening portion OP3.

The third guide part GD3 may control or limit the rotation of the first rotation member 220. For example, when the first rotation member 220 is rotated, the third guide part GD3 may move in the second direction DR2 along the third rail Ra3. When the movement of the third guide part GD3 is stopped by one of third barrier parts RD3 disposed at both ends of the third rail Ra3, the first rotation member 220 is caught by the third guide part GD3, thereby controlling or limiting the rotation of the first rotation member 220.

The first and third rails Ra1 and Ra3 have the same spiral shape. In some implementations, the shape of the third rail Ra3 may be substantially the same as that of the second rail Ra2. In the case that the shape of the third rail Ra3 is the same as the shape of the second rail Ra2, the third guide part GD3 may move a direction opposite to a direction in which the first guide part GD1 moves when the first rotation member 220 rotates. For example, when the flexible display panel 110 is exposed to the outside of the first housing 120, the first and second guide parts GD1 and GD3 may both be disposed adjacent to the area in which the flexible display panel 110 is rolled.

A fourth rail Ra4 may be defined at the other end of the second rotation member 230. The fourth rail Ra4 may be spaced apart from the area of the second rotation member 230, around which the flexible display panel 110 is rolled. For example, the second and fourth rails Ra2 and Ra4 may be positioned such that the area of the second rotational member 230 around which the flexible display panel 110 is rolled is disposed between the second and fourth rails Ra2 and Ra4.

The fourth rail Ra4 may have a spiral shape spiraling around the second rotation member 230 and along the second direction DR2. The fourth rail Ra4 may be a spiral-shaped engraving recess HR (refer to FIG. 4A) defined in the second rotation member 230.

A fourth guide part GD4 may be inserted into the fourth rail Ra4 after penetrating through the second housing 130. For example, the second housing 130 may be provided with a fourth opening portion OP4 formed therethrough along the second direction DR2. The fourth guide part GD4 may be inserted into the fourth rail Ra4 after passing through the fourth opening portion OP4.

The fourth guide part GD4 may control or limit the rotation of the second rotation member 230. For example, when fourth rotation member 230 is rotated, the fourth guide part GD4 may move in the second direction DR2 along the fourth rail Ra4. When the movement of the fourth guide part GD4 is stopped by one of the fourth barrier parts RD4 disposed at both ends of the fourth rail Ra4, the second rotation member 230 may be caught by the fourth guide part GD4, thereby controlling or limiting the rotation of the second rotation member 230.

At least one of the first to fourth rails Ra1 to Ra4 may be used with the rollable display device 100. For example, as illustrated in FIG. 1 the rollable display device 100 may include all of the first, second, third, and fourth rails Ra1, Ra2, Ra3, and Ra4.

Figure 2:
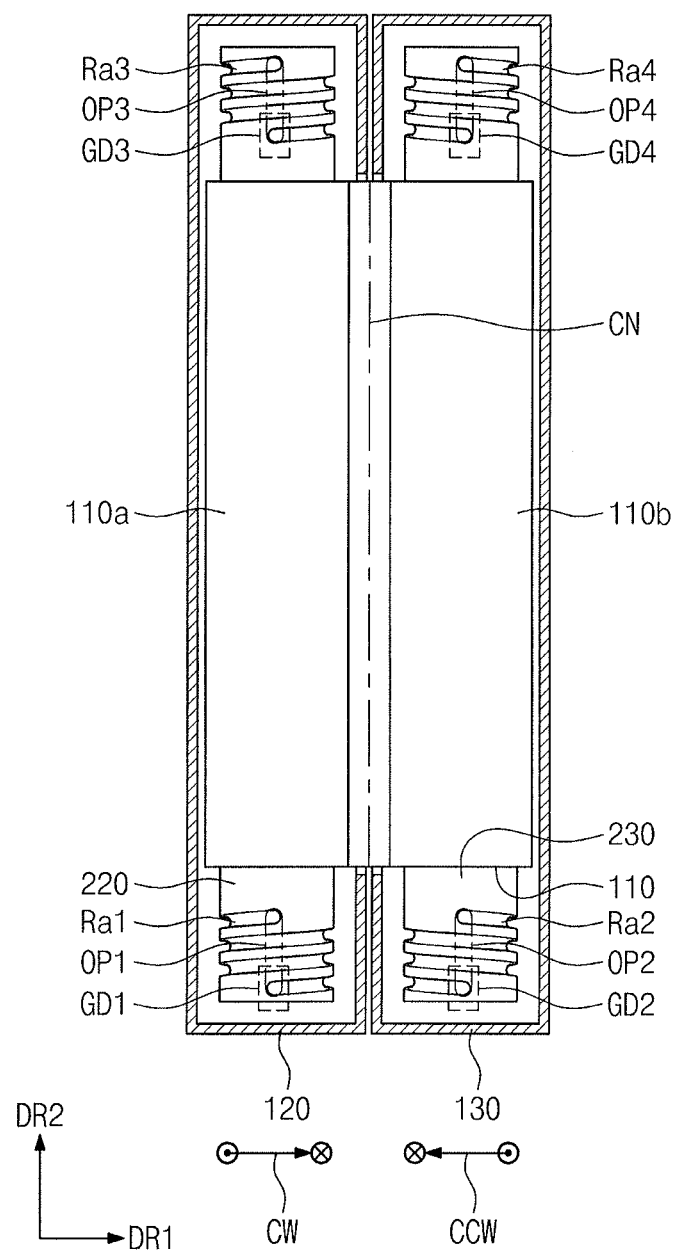
FIG. 2 illustrates a plan view showing an operation state of the rollable display device shown in FIG. 1.

FIG. 2 illustrates a plan view showing an operation state of the rollable display device 100 shown in FIG. 1. For example, FIG. 2 shows the state in which the flexible display panel 110 is inside the first and second housings 120 and 130. In FIG. 2, the same reference numerals denote the same elements in FIG. 1, and thus detailed descriptions of the same elements will not be repeated.

Referring to FIG. 2, when the flexible display panel 110 is completely rolled around the first and second rotation members 220 and 230, the first to fourth guide parts GD1 to GD4 may be disposed at the ends of the first to fourth rails Ra1 to Ra4. Accordingly, the first rotation member 220 may be fixed by the first and third guide parts GD1 and GD3, and thus, the first rotation member 220 may not be rotated in a clockwise direction CW to further wind the flexible display panel 110. In addition, the second rotation member 230 may be fixed by the second and fourth guide parts GD2 and GD4, and thus, the second rotation member 230 may not be rotated in a counter-clockwise direction CCW to further wind the flexible display panel 110.

For example, the area of the first portion 110a may be substantially the same as the area of the second portion 110b. In this case, a length in the first direction DR1 of the first portion 110a may be substantially equal to a length in the first direction DR1 of the second portion 110b. A boundary line, at which the first portion 110a contacts the second portion 110b, may correspond to a center line CN of the flexible display panel 110. A rotation number of the first and second rotation members 220 and 230 may be controlled when the flexible display panel 110 is rolled around the first and second rotation members 220 and 230 such that the center line CN is not biased towards the first rotation member 220 and the second rotation member 230.

For example, the length of the flexible display panel 110 that is rolled around the first and second rotation members 220 and 230 may be limited to a predetermined length. The flexible display panel 110 may be prevented from being biased to one of the first and second housings 120 and 130 while being rolled into the first and second housings 120 and 130. As a result, the flexible display panel 110 may be prevented from being stuck in the first or second housings 120 or 130.

Figure 3:
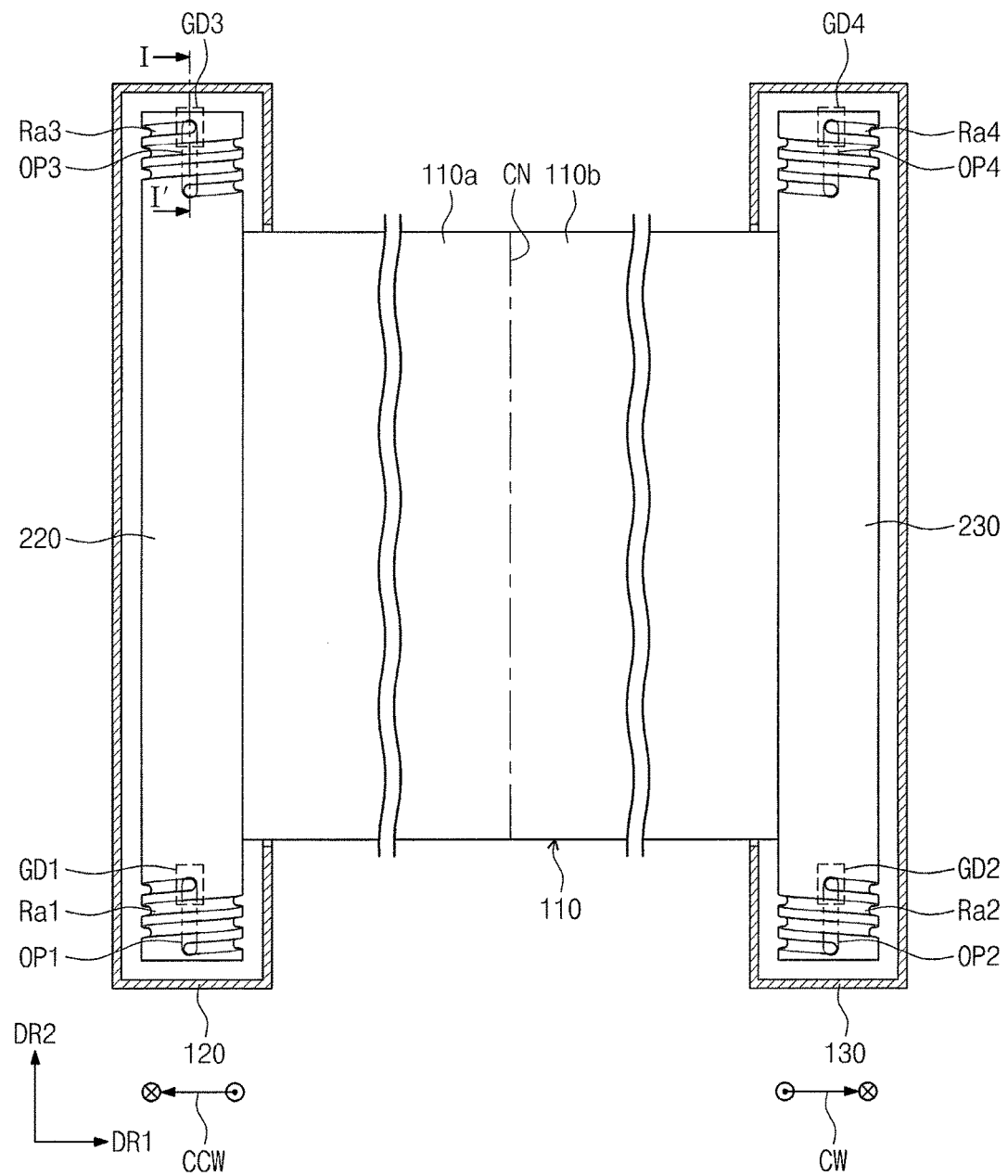
FIG. 3 illustrates a plan view showing an operation state of the rollable display device shown in FIG. 1.

FIG. 3 illustrates a plan view showing an operation state of the rollable display device 110 shown in FIG. 1. For example, FIG. 3 shows the state in which the flexible display panel 110 is completely exposed to the outside of the first and second housings 120 and 130. In FIG. 3, the same reference numerals denote the same elements in FIG. 1, and thus detailed descriptions of the same elements will not be repeated.

Referring to FIG. 3, when the flexible display panel 110 is completely exposed to the outside of the first and second housings 120 and 130, the first to fourth guide parts GD1 to GD4 are disposed at the other ends of the first to fourth rails Ra1 to Ra4. Accordingly, the first rotation member 220 is fixed by the first and third guide parts GD1 and GD3, and thus the first rotation member 220 may not be further rotated in the counter-clockwise direction CCW to spread the flexible display panel 110. In addition, the second rotation member 230 may be fixed by the second and fourth guide parts GD2 and GD4, and thus the second rotation member 230 may not be further rotated in the clockwise direction CW to spread the flexible display panel 110.

When the flexible display panel 110 is completely spread, the first and second rotation members 220 and 230 are not rotated anymore. Thus, the flexible display panel 110 may be prevented from rolling in an opposite direction or from being bent due to the first and second rotation members 220 and 230 being additionally rotated after the flexible display panel 110 is completely spread.

Figure 4A:
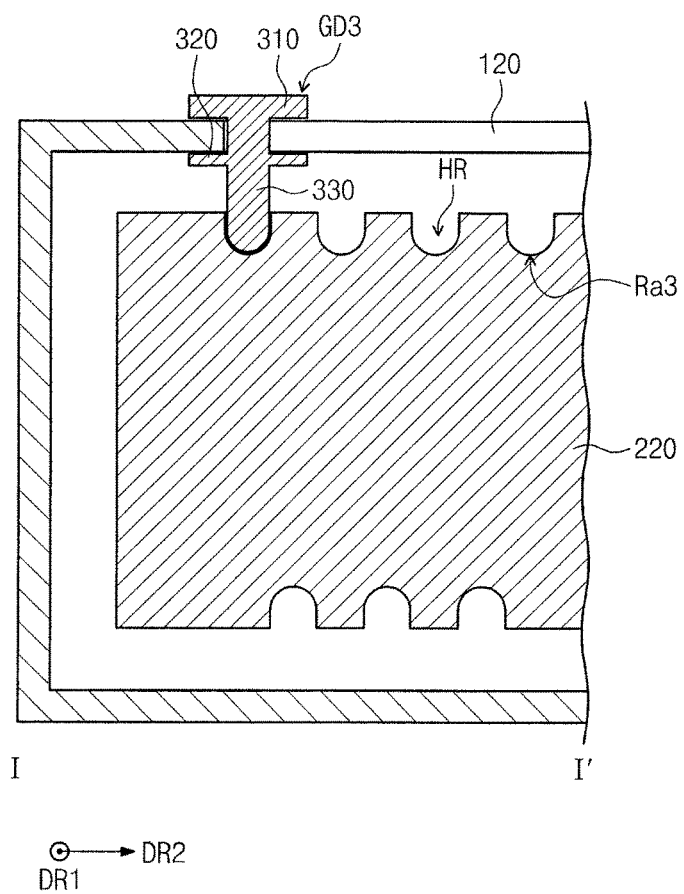
FIG. 4A illustrates a cross-sectional view taken along a line I-I' shown in FIG. 3.

FIG. 4A illustrates a cross-sectional view taken along a line I-I' shown in FIG. 3. For the convenience of explanation, FIG. 4A shows only the third guide part GD3. The first, second, and fourth guide parts GD1, GD2, and GD4 may have the same structure and function as the third guide part GD3. Accordingly, detailed descriptions of the first, second, and fourth guide parts GD1, GD2, and GD4 will not be repeated. In FIG. 4A, the same reference numerals denote the same elements in FIG. 1, and thus detailed descriptions of the same elements will not be repeated.

Referring to FIG. 4A, the third guide part GD3 may include an upper portion 310, a stop portion 320, and an insert portion 330. The upper portion 310, the stop portion 320, and the insert portion 330 may be integrally formed with each other.

The upper portion 310 may move in the second direction DR2 along an outer surface of the first housing 120. The stop portion 320 may be disposed under the upper portion 310. The upper portion 310 and the stop portion 320 may be spaced apart from each other by a thickness of the first housing 120. The stop portion 320 may help prevent the third guide part GD3 from being separated from the first housing 120. The insert portion 330 may be inserted into the third rail Ra3. The insert portion 330 may have a shape corresponding to the engraving recess HR of the third rail Ra3. The insert portion 330 may move in the second direction DR2 due to the rotation of the first rotation member 220 while remaining inserted in the third rail Ra3.

The engraving recess HR may have an approximate U-shape in a cross section. In other implementations, the engraving recess HR may have a polygonal shape in a cross section. The shape of the insert portion 330 in the cross section may be varied depending on the shape of the engraving recess HR.

Figure 4B:
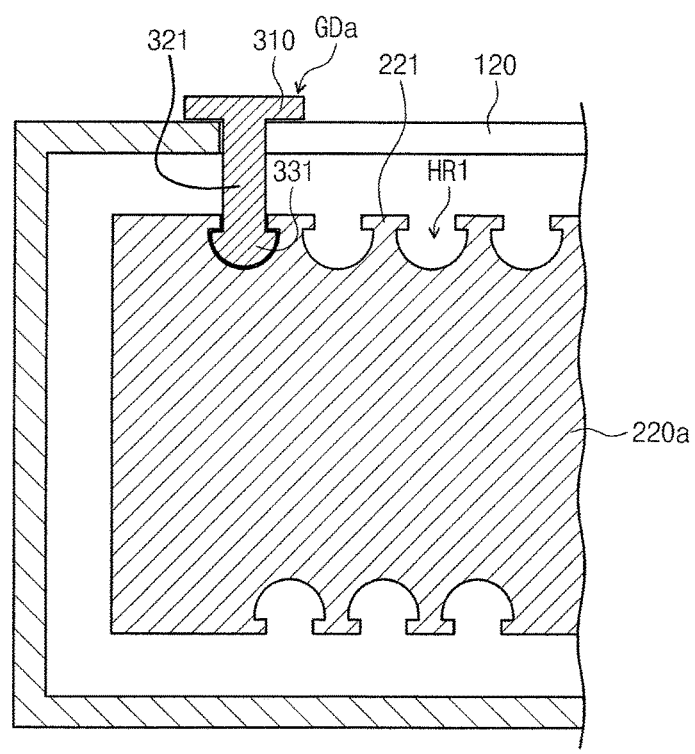
FIG. 4B illustrates a cross-sectional view showing a first rail according to another exemplary embodiment.

FIG. 4B illustrates a cross-sectional view showing a first rail according to another exemplary embodiment.

Referring to FIG. 4B, a spiral-shaped engraving recess HR1 may be defined in a rotation member 220a. The rotation member 220a may further include a protrusion 221 to control a shape of the engraving recess HR1.

A guide part GDa may include an upper portion 310, a connection portion 321, and an insert portion 331. The upper portion 310, the connection portion 321, and the insert portion 331 may be integrally formed with each other.

The upper portion 310 may move in the second direction DR2 along an outer surface of a housing 120. The insert portion 331 may be inserted in the engraving recess HR1. The insert portion 331 may have a cross-section shape corresponding to a cross-section shape of the engraving recess HR1. The upper portion 310 and the insert portion 331 may be connected to each other by the connection portion 321.

In the present exemplary embodiment, the protrusion 221 may prevent the insert portion 331 from being separated from the rotation member 220a. Accordingly, a separate member. e.g., the stop portion 320 shown in FIG. 4A, may be omitted.

Figure 5:
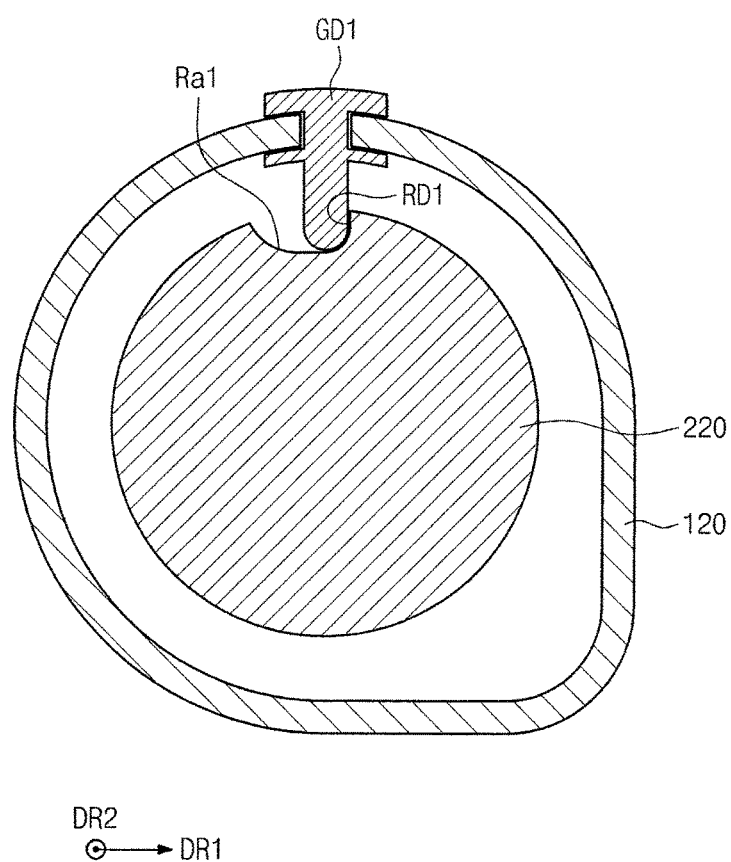
FIG. 5 illustrates a cross-sectional view showing a first housing shown in FIG. 3.

FIG. 5 illustrates a cross-sectional view showing the first housing 120 shown in FIG. 3. FIG. 5 illustrates the cross sectional view taken along the first direction of the first housing 120 and the first guide part GD1. Referring to FIGS. 3 and 5, when the flexible display panel 110 is completely exposed to the outside of the first housing 120 or the first portion 110a of the flexible display panel 110 is completely rolled into the first housing 120, the movement of the first guide part GD1 is stopped. For example, the first guide part GD1 may be blocked by the first barrier parts RD1 of the first rail Ra1, and thus the first guide part GD1 may be prevented from moving further.

Accordingly, the rotation of the first rotation member 220 may be controlled by the first guide part GD1. As a result, the flexible display panel 110 may be uniformly rolled into the first and second housings 120 and 130. In addition, when the flexible display panel 110 is completely spread, the first and second rotation members 220 and 230 may be prevented from rotating further. Thus, the flexible display panel 110 may be prevented from rolling in an opposite direction or from being bent due to the first and second rotation members 220 and 230 being additionally rotated after the flexible display panel 110 is completely spread.

Figure 6:
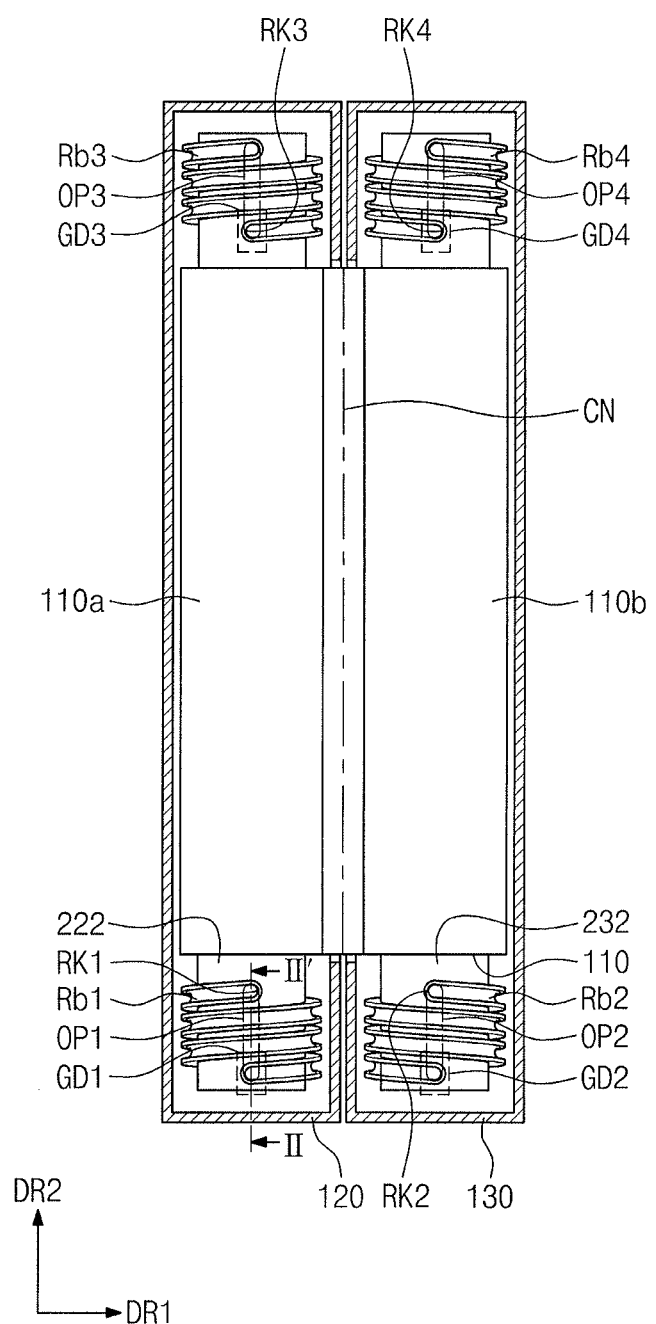
FIG. 6 illustrates a plan view showing a rollable display device according to another exemplary embodiment.
Figure 7:
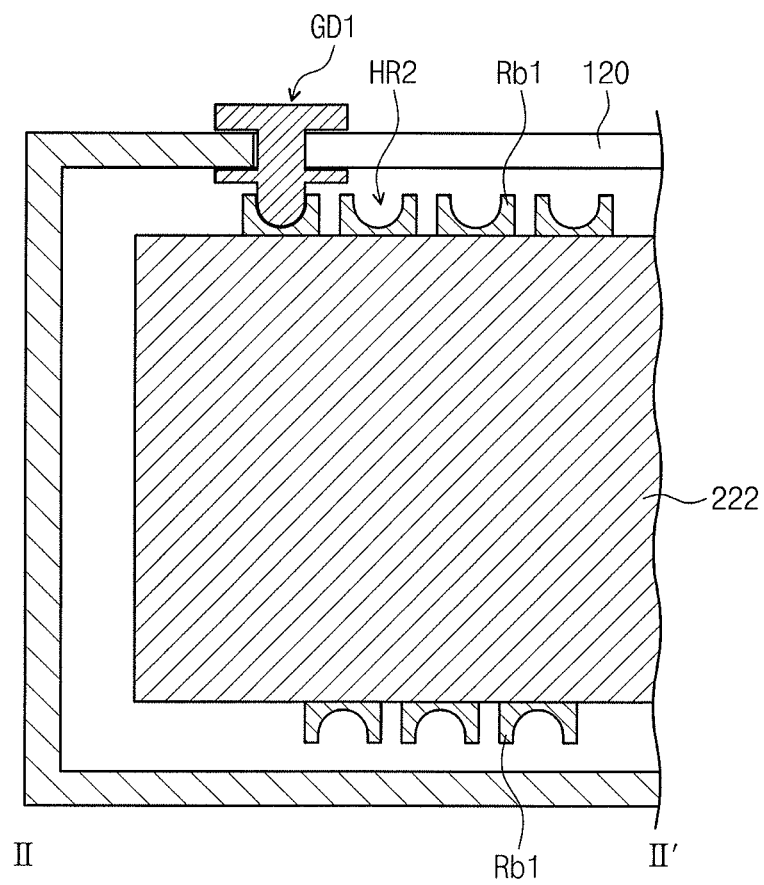
FIG. 7 illustrates a cross-sectional view taken along a line II-II' shown in FIG. 6.

FIG. 6 illustrates a plan view showing a rollable display device according to another exemplary embodiment and FIG. 7 illustrates a cross-sectional view taken along a line II-II' shown in FIG. 6.

Referring to FIGS. 6 and 7, each of first, second, third, and fourth rails Rb1, Rb2, Rb3, and Rb4 may have a spiral-shaped engraving recess HR2.

The first rail Rb1 may be disposed at an outer surface of one end of a first rotation member 222 and the second rail Rb2 may be disposed at an outer surface of one end of a second rotation member 232. The third rail Rb3 may be disposed at an outer surface of the other end of the first rotation member 222 and the fourth rail Rb4 may be disposed at an outer surface of the other end of the second rotation member 232. In the present exemplary embodiment, the first to fourth rails Rb1 to Rb4 may be attached to the first and second rotation members 222 and 232 after being separately manufactured, and thus a design of the first and second rotation members 222 and 232 may be easily changed.

First barrier parts RK1 may be respectively disposed at both ends of the first rail Ra1, Second barrier parts RK2 may be respectively disposed at both ends of the second rail Ra2, Third barrier parts RK3 may be respectively disposed at both ends of the third rail Ra3, and fourth barrier parts RK4 may be respectively disposed at both ends of the fourth rail Ra4.

Movement of first, second, third, and fourth guide parts GD1, GD2, GD3, and GD4 may be stopped by the first, second, third, and fourth barrier parts RK1, RK2, RK3, and RK4, respectively. Therefore, the rotation of the first and second rotation members 222 and 232 may be controlled by the first to fourth rails Rb1 to Rb4 and the first to fourth guide parts GD1 to GD4.

As a result, the flexible display panel 110 may be uniformly rolled into the first and second housings 120 and 130. When the flexible display panel 110 is completely spread, the first and second rotation members 222 and 232 may be prevented from being further rotated. Thus, the flexible display panel 110 may be prevented from rolling in an opposite direction or from being bent due to the first and second rotation members 222 and 232 being additionally rotated after the flexible display panel 110 is completely spread.

By way of summation and review, a rollable display device has advantages such as a wide display area and a superior transportability. A rollable display device may include a housing and a flexible display panel rolled into the housing. However, extreme stress may be applied to portions of the flexible display panel while the flexible display panel is rolled into the housing, and defects in pixels arranged in the portions of the flexible display panel may be caused.

Embodiments advance the art by providing a rollable display device that may be easily accommodated. The rotation number of the first rotation member winding the first portion of the flexible display panel and the rotation number of the second rotation member winding the second portion of the flexible display panel may be controlled. Therefore, the flexible display panel may be uniformly kept inside the first and second housings. In addition, when the flexible display panel is completely spread, the flexible display panel may be prevented from rolling in an opposite direction or from being bent due to the additional rotation of the first and second rotation members Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof.

What is claimed is:

1. A rollable display device, comprising:
   a flexible display panel that displays an image;
   a first housing, inside which a first portion of the flexible display panel is storable;
   a second housing, inside which a second portion of the flexible display panel is storable;
   a first rotation member inside the first housing, the first portion of the flexible display panel being windable and unwindable on the first rotation member;
   a second rotation member inside the second housing, the second portion of the flexible display panel being windable and unwindable on the second rotation member;
   a first rail at one end of the first rotation member, the first rail being defined in the first rotation member to have a spiral shape having two ends; and
   a first guide part penetrating through the first housing and being inserted in the first rail.

2. The rollable display device as claimed in claim 1, further comprising first barrier parts that block both ends of the first rail, wherein:
   the first rotation member is rotatable while the first guide part moves along the first rail, and
   the first barrier parts block the movement of the first guide part.

3. The rollable display device as claimed in claim 1, wherein:
   the first housing includes a first opening portion extending through the first housing along a second direction crossing a first direction, and
   the first guide part extends through the first opening portion and is inserted in the first rail, and
   the first and second housings are spaced apart from each other in the first direction.

4. The rollable display device as claimed in claim 3, wherein the first guide part is moveable along the second direction in the first opening portion.

5. The rollable display device as claimed in claim 1, wherein the first rail is in a form of a spiral-shaped engraving recess defined in the first rotation member.

6. The rollable display device as claimed in claim 1, wherein the first rail is in a form of a spiral-shaped engraving recess located on an outer surface of the first rotation member.

7. The rollable display device as claimed in claim 1, wherein:
the first portion of the flexible display has an area that is substantially the same as an area of second portion of the flexible display, and
a boundary line at which the first portion makes contact with the second portion corresponds to a center line of the flexible display panel.

8. The rollable display device as claimed in claim 1, further comprising:
a second rail at one end of the second rotation member, the second rail being defined in the second rotation member to have a spiral shape having two ends; and
a second guide part penetrating through the second housing and being inserted in the second rail, wherein the second rotation member being rotatable while the second guide part moves along the second rail.

9. The rollable display device as claimed in claim 8, further comprising second barrier parts that block both ends of the second rail, the second barrier parts blocking the movement of the second guide part.

10. The rollable display device as claimed in claim 8, wherein the second rail is in a form of a spiral-shaped engraving recess defined in the second rotation member.

11. The rollable display device as claimed in claim 8, wherein the second rail is in a form of a spiral-shaped engraving recess located on an outer surface of the second rotation member.

12. The rollable display device as claimed in claim 8, wherein:
the second housing includes a second opening portion extending through the second housing along a second direction crossing a first direction,
the second guide part extends through the second opening portion and is inserted in the second rail, and
the first and second housings are spaced apart from each other in the first direction.

13. The rollable display device as claimed in claim 12, further comprising:
a third rail at an other end of the first rotation member, the third rail being defined in the first rotation member to have a spiral shape having two ends;
a fourth rail disposed at an other end of the second rotation member, the fourth rail being defined in the second rotation member to have a spiral shape having two ends;
a third guide part penetrating through the first housing and being inserted in the third rail; and
a fourth guide part penetrating through the second housing being inserted in the fourth rail.

14. The rollable display device as claimed in claim 13, wherein:
the first housing includes a third opening portion extending along the second direction,
the second housing includes a fourth opening portion extending along the second direction,
the third guide part passes through the third opening portion and is inserted in the third rail, and
the fourth guide part passes through the fourth opening portion and is inserted in the fourth rail.

15. The rollable display device as claimed in claim 13, further comprising:
third barrier parts blocking both ends of the third rail, the third barrier parts blocking the movement of the third guide part; and
fourth barrier parts blocking both ends of the fourth rail, the fourth barrier parts blocking the movement of the fourth guide part.

16. The rollable display device as claimed in claim 13, wherein:
the third rail is in a form of a spiral-shaped engraving recess defined in the first rotation member, and
the fourth rail is in a form of a spiral-shaped engraving recess defined in the second rotation member.

17. The rollable display device as claimed in claim 13, wherein:
the third rail is in a form of a spiral-shaped engraving recess and is located on an outer surface of the first rotation member, and
the fourth rail is in a form of a spiral-shaped engraving recess and is located on an outer surface of the second rotation member.

* * * * *